Sept. 4, 1928.　　　　　G. OTTO ET AL　　　　　1,682,797
APPARATUS FOR SPINNING ARTIFICIAL SILK
Filed March 23, 1925　　　3 Sheets-Sheet 2
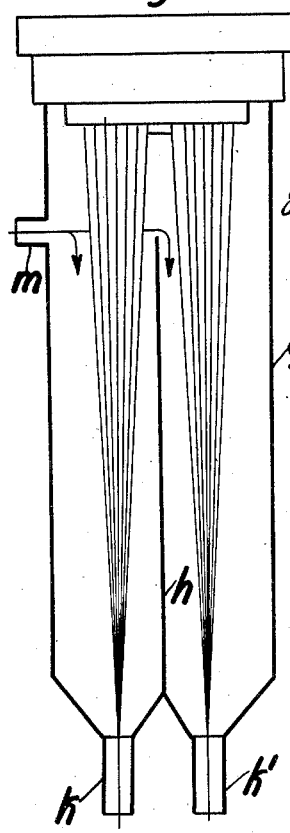
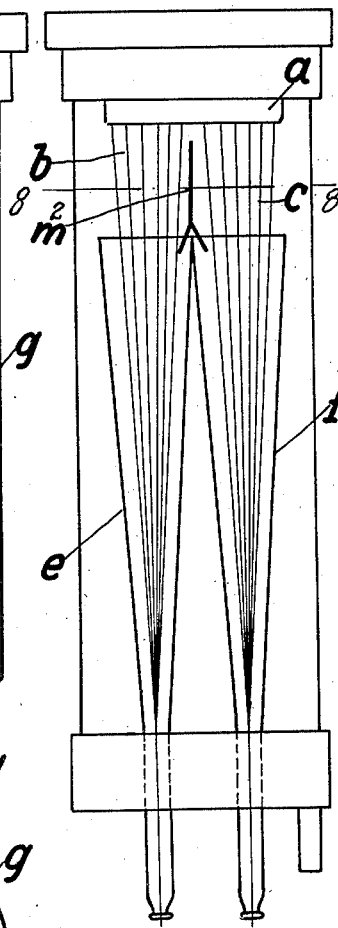
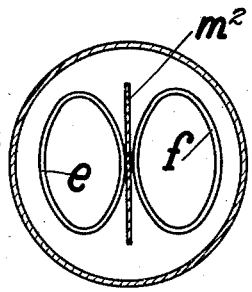
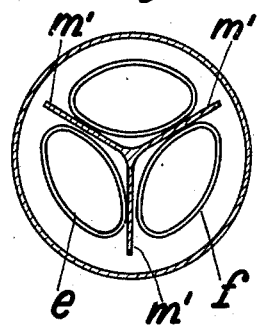

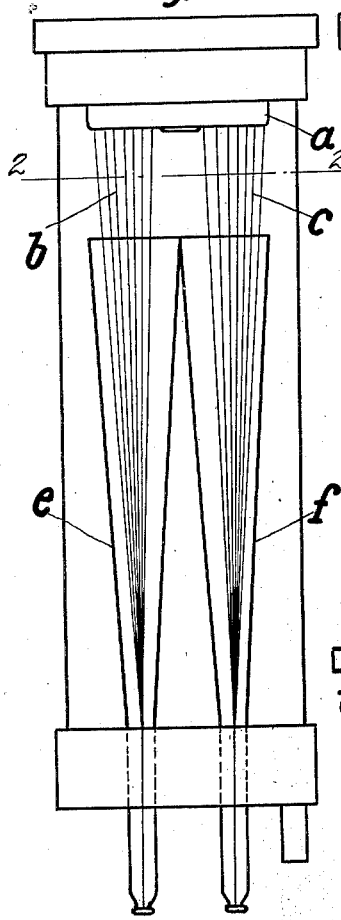
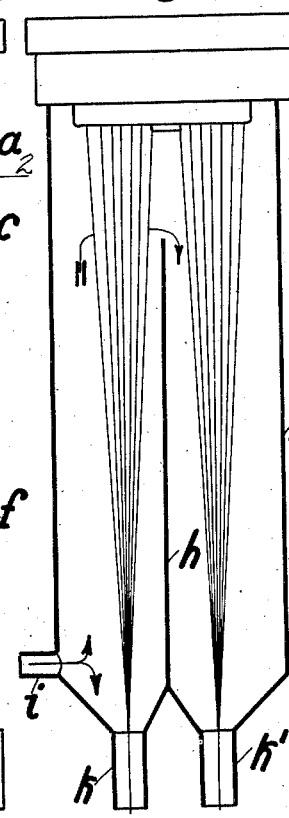
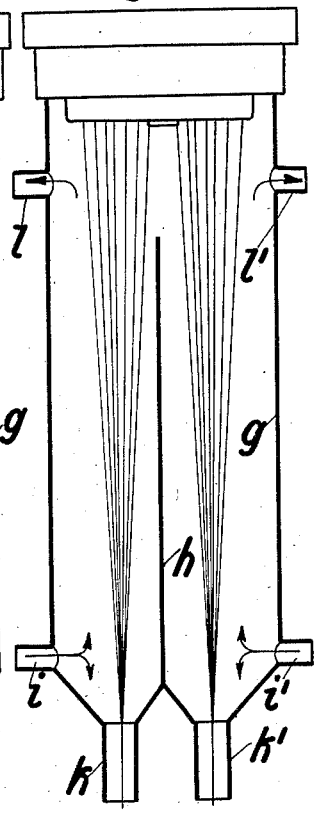
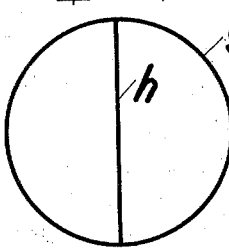
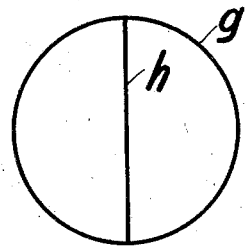
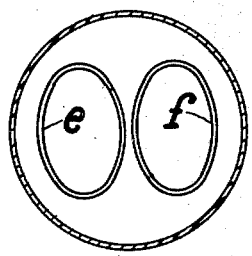
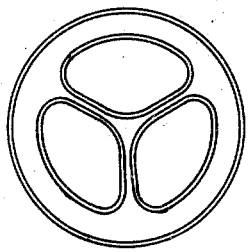

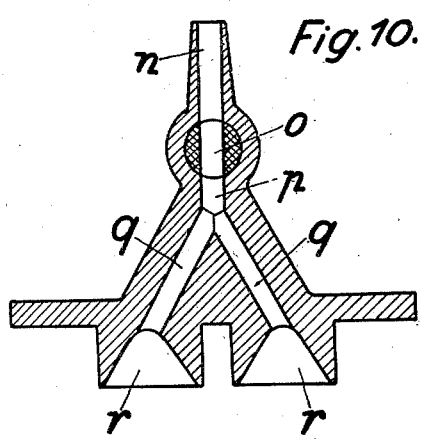
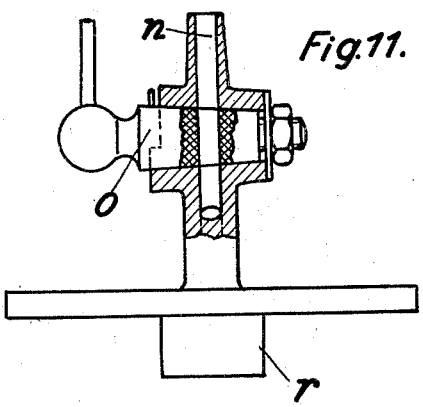
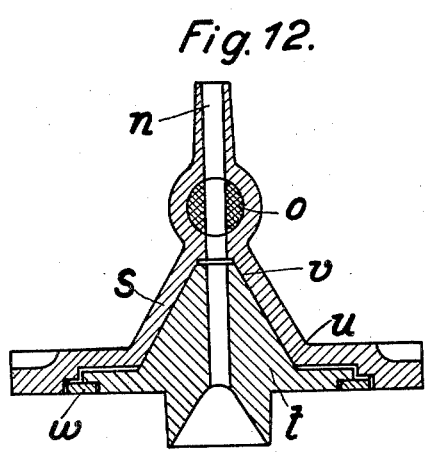
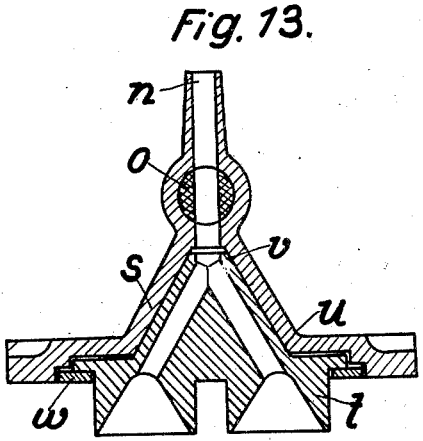
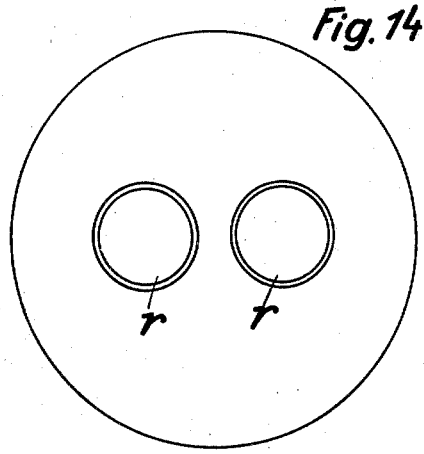
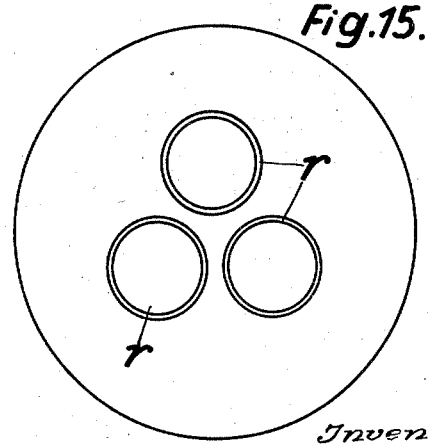

Patented Sept. 4, 1928.

1,682,797

UNITED STATES PATENT OFFICE.

GUSTAV OTTO, AUGUST HARTMANN, AND GOTTHARD BAURIEDEL, OF BARMEN, GERMANY, ASSIGNORS, BY MESNE ASSIGNMENTS, TO AMERICAN BEMBERG CORPORATION, A CORPORATION OF DELAWARE.

APPARATUS FOR SPINNING ARTIFICIAL SILK.

Application filed March 23, 1925, Serial No. 17,811, and in Germany May 30, 1924.

The devices used hitherto for spinning artificial silk by the spinning method, in which the filaments are drawn, all have the common principle, that the bundle of filaments emerges from the spinning nozzle, is thereupon coagulated by the precipitant, thoroughly lixiviated and drawn out, after which it finally emerges from the outlet opening into the open air.

The present invention consists in spinning by the stretch spinning method a plurality of bundles of filaments simultaneously in a single spinning funnel, each emerging separately from the funnel.

The filaments coming from the nozzle are subdivided into several bundles of filaments, according to the number of outlet openings, each such bundle being collected in such an outlet opening and conducted away. The outlet openings may be flared out towards the top so as to form a cone and may be extended upwards to a greater or less extent towards the spinning nozzle.

The invention enables the production to be increased by the stretch spinning method up to several times that previously obtained, since with the same spinning device, which has hitherto only produced a single bundle of filaments, a number of such bundles may be produced simultaneously, the number of workers not being increased.

On a single filament breaking, it may happen that the freshly formed single filament is drawn across by the flow of water into the wrong cone, which may cause undesirable interruptions in the operation. For preventing this a partition may be placed above the cones in the centre plane between the same, the top of which extends almost to the nozzle. This partition may be fixed either by being wedged between the two cones or it is placed on one or both of the cones. In order that the partition shall not have too great an effect on the flow of water in the upper part of the cylinder, it is provided with perforations, preferably with round holes of not too great a size or with narrow slits.

According to the invention the new device comprises a suitable spinning nozzle head, as the old nozzle heads as used hitherto for the production of single threads cannot be used as they are. If, for spinning two or more threads, only the nozzle itself is suitably altered it is not always possible to convey the two bundles of filaments completely separately into the two spinning cones. This drawback is overcome by the nozzle head according to the invention, which is adapted to take two or more nozzles. In this nozzle head the separate bundles of filaments are placed so far apart that a filament cannot get across from one bundle to another.

In the accompanying drawings several constructional examples of the invention are shown diagrammatically.

Fig. 1 is a vertical longitudinal section of one example of the device with two spinning cones in a cylindrical casing, Figs. 2 and 3 are cross-sections above the spinning cone, Figure 2 showing two and Figure 3 three spinning cones.

Figs. 4 to 6 are vertical longitudinal sections through three further constructional examples, in which in place of two spinning cones in the cylindrical casing only a partition is provided, which divides the interior of the casing into two parts. These three examples differ as regards the way in which the precipitant is conveyed through the device.

Fig. 7 is a vertical longitudinal section through a constructional form similar to that shown in Fig. 1 with a partition placed above the spinning cones.

Figs. 8 and 9 are cross-sections above the spinning cones and show two and three cones respectively.

Fig. 10 is a section through a nozzle head consisting of one piece with two outlet openings, Fig. 11 shows the same nozzle head in side elevation partly in section, Fig. 12 is a section through a cock casing with a removable insertion for one nozzle, Fig. 13 is a section through a cock casing with a removable insertion for two nozzles.

Figs. 14 and 15 are plan views showing how two or more nozzles may be relatively placed.

In the first constructional example shown in Figs. 1 and 2 there are two cones $e$ and $f$. The filaments emerge from the spinning nozzle $a$ and are separated into the two bundles $b$ and $c$, which are then conveyed away from the outlet openings of the nozzles $e$ and $f$. Instead of dividing the bundle of filaments emerging from the nozzle, two or more nozzles may be provided in the cylinder, as will be described below.

The two cones may be replaced by any other suitable arrangements for conveying the bundles of filaments separately to the outlet openings. In Figs. 4, 5 and 6 for instance the cylindrical casing $g$ of the spinning device is divided by a partition $h$ into two semicircular spaces, through each of which a bundle of filaments passes. In Fig. 4 the precipitant is introduced through the branch $i$, passes partly in the same direction as the filaments to the outlet branch $k$ and partly upwards in counterflow to the filaments and over the partition $h$ into the other compartment of the casing $g$, from where it flows out through the branch $k'$ with the filaments.

In Fig. 5 two inlets $i$ and $i'$ for the precipitant are provided and one or two outlets $l$ and $l'$ for the precipitant are provided at the top of the casing. The precipitant in this case flows in both compartments partly in the same direction as and partly in the opposite direction to the bundles of filaments.

In Fig. 6 the precipitant is introduced at the top at $m$ and flows in the same direction as the filaments through both compartments to the outlet branches $k$ and $k'$.

The bottoms of the two compartments are made funnel-shaped, so as to facilitate the passage of the bundles out of the casing.

In Figs. 7 and 8 the space above the cones is divided by a partition $m^2$, which prevents a newly formed filament, after a single filament has broken, from being drawn into the wrong cone through any irregularity in the flow of water or through any other cause. In Fig. 8 a cross-section above two spinning cones $e$ and $f$ is shown. The filaments emerge from the spinning nozzle $a$ and pass in two bundles $b$ and $c$ on either side of the partition $m^2$ to the cones $e$ and $f$.

When three cones are provided, as in Fig. 9, the cones are separated from one another by a partition $m'$, which is star-shaped, as shown in Fig. 9. In the constructional examples shown the partition $m^2$ or $m'$ is fixed by being placed on the cones themselves.

The nozzle heads for the above device shall now be described:—

In the constructional forms according to Figs. 10 and 11 the spinning solution enters the neck portion of the nozzle head at $n$. The amount flowing through is regulated at $o$ by a cock or valve. Behind the cock the spinning liquid enters the first part $p$ of the system of distributing passages $q$. From this system the solution is conveyed into the funnel-shaped outlet openings $r$, which are covered by spinning nozzles of a known type (not shown) and through the said nozzles into the spinning cylinder.

The nozzle head shown in Figs. 12 and 13 consists substantially of a cock or valve casing $s$ and an inserted part $t$. The inserted part, the upper part of which is frusto-conical as from $u$—$v$, is fitted, for instance by grinding, into the cock casing, which has a correspondingly conical bore, and is held in position by a retaining ring $w$. In Fig. 12 an insertion for one spinning nozzle is shown and in Fig. 13 an insertion for two spinning nozzles. With this constructional form insertions for more than two nozzles can be used. The path followed by the spinning solution in the spinning head, shown in Fig. 13, is the same as in the constructional forms shown in Figs. 10 and 11.

It will be readily seen from Figs. 12 and 13 that the cock casing with the fitted insertion provides a constructional form, which enables one or more threads to be spun with the same main part of the nozzle head, simply by changing the insertion.

What we claim is:—

1. A device for spinning artificial silk comprising in combination a nozzle for introducing a viscous spinning fluid into a casing, means for introducing a precipitating fluid into said casing, means for dividing the bundle of filaments coming from said nozzle into a plurality of bundles and means for keeping the divided bundles separate as they go through and pass out of the casing together with the precipitating liquid.

2. A device for spinning artificial silk comprising in combination a nozzle for introducing a viscous spinning fluid into a casing, means for introducing a precipitating fluid into said casing, means for dividing the bundle of filaments coming from said nozzle into a plurality of bundles and a plurality of spinning cones in said casing corresponding to the number of bundles and having each an outlet opening for the separated bundles of filaments and the separated streams of precipitating liquid.

3. A device for spinning artificial silk comprising in combination a nozzle for introducing a viscous spinning fluid into a casing, means for introducing a precipitating fluid into said casing, means for dividing the bundle of filaments coming from said nozzle into a plurality of bundles, vertical partitions in the casing for keeping the divided bundles separate and dividing the stream of precipitating liquid into separate streams corresponding to the number of separate bundles of filaments and a separate outlet in the bottom of the casing for each bundle of filaments and its cooperating stream of precipitating liquid.

4. A device for spinning artificial silk comprising in combination a nozzle for introducing a viscous spinning fluid into a casing, means for introducing a precipitating fluid into said casing, means for dividing the bundle of filaments coming from said nozzle into a plurality of bundles, vertical partitions in the casing for keeping the divided bundles separate and dividing the stream of precipitating liquid into separate streams corresponding to the number of separate bundles of filaments, conical outlet passages from the casing corresponding in number to the number of bundles and having a common outlet for each of the single bundles of filaments and its cooperating stream of precipitating liquid.

5. A device for spinning artificial silk comprising in combination a nozzle for introducing a viscous spinning fluid into a casing, means for introducing a precipitating fluid into said casing, means for dividing the bundle of filaments coming from said nozzle into a plurality of bundles, a plurality of spinning cones in said casing corresponding to the number of bundles and vertical partitions between the spinning cones and the spinning nozzle.

6. A device for spinning artificial silk comprising in combination a nozzle for introducing a viscous spinning fluid into a casing, means for introducing a precipitating fluid into said casing, means for dividing the bundle of filaments coming from said nozzle into a plurality of bundles, a plurality of spinning cones in said casing corresponding to the number of bundles and perforated vertical partitions between the spinning cones and the spinning nozzle.

In testimony whereof we have signed our names to this specification.

GUSTAV OTTO.
Dr. AUGUST HARTMANN.
Dr. GOTTHARD BAURIEDEL.